Aug. 26, 1924.

R. J. PURDY ET AL 1,506,134

WINDSHIELD VISOR

Filed Oct. 9, 1922    2 Sheets-Sheet 1

Inventors
Raymond J. Purdy
Robert T. Potter

Attorneys

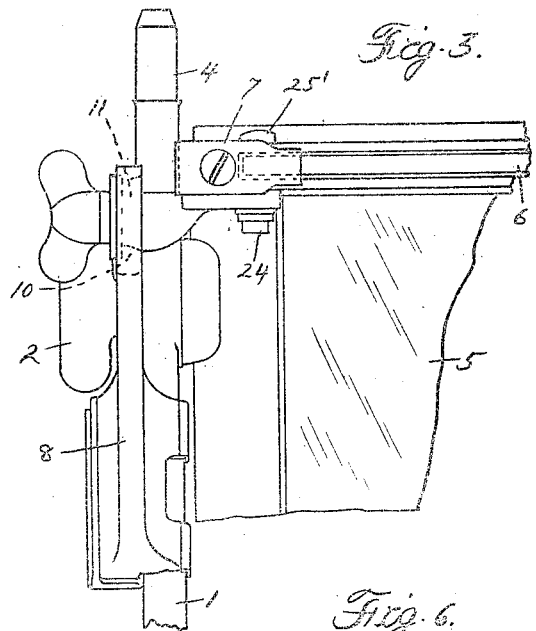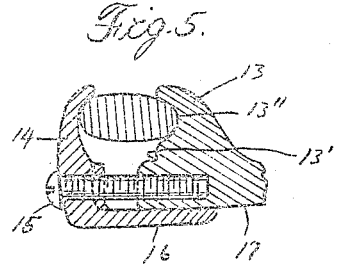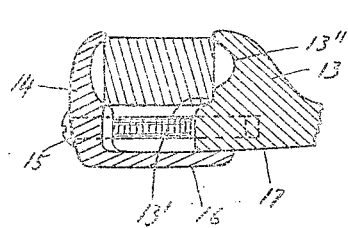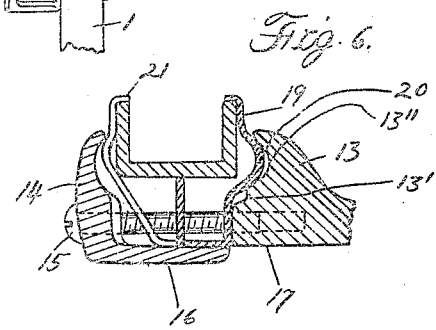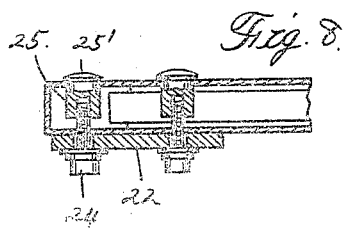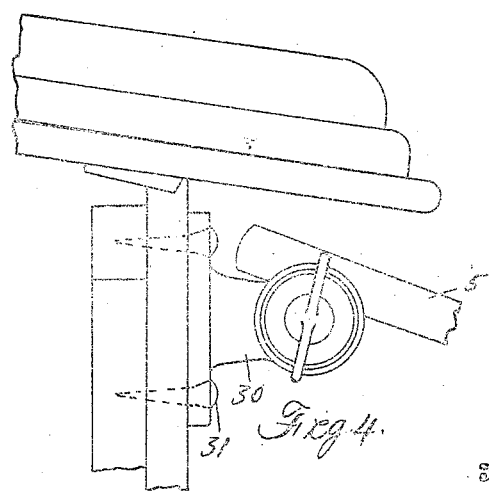

Patented Aug. 26, 1924.

1,506,134

UNITED STATES PATENT OFFICE.

RAYMOND J. PURDY AND ALBERT T. POTTER, OF DETROIT, MICHIGAN, ASSIGNORS TO AINSWORTH MANUFACTURING COMPANY, OF DETROIT, MICHIGAN, A CORPORATION OF MICHIGAN.

WINDSHIELD VISOR.

Application filed October 9, 1922. Serial No. 593,260.

*To all whom it may concern:*

Be it known that we, RAYMOND J. PURDY and ALBERT T. POTTER, citizens of the United States of America, residing at Detroit, in the county of Wayne and State of Michigan, have invented certain new and useful Improvements in Windshield Visors, of which the following is a specification, reference being had therein to the accompanying drawings.

This invention relates to improvements in windshield visors.

An object of the invention is to provide a simple form of visor that can be readily and quickly attached to standards of various sizes and constructions.

Another object is to provide a relatively light visor that can be easily adjusted to various positions with respect to the windshield.

Another object is to provide a neat and attractive visor mounting which is adjustable for adapting the visor to different widths of windshields and which is provided with a strong and durable jaw construction for engagement with the windshield frame.

Another object is to provide efficient and reliable means for guiding one of the jaw members while the same is being adjusted upon the windshield standards to relieve the clamping screws of any transverse or shearing stresses.

With the above and other objects in view the invention consists in certain novel features of construction, combination and arrangement of parts as will be more fully described and particularly pointed out in the appended claims.

In the accompanying drawings:

Figure 3 is a front elevation;

Figure 4 is a view similar to Figure 1 showing a modified construction for attachment to closed body cars;

Figure 5 is a section on line 5—5 of Figure 1 showing the clamping means for the supporting brackets;

Figure 6 is a similar section showing a modified construction;

Figure 7 is a sectional view similar to Fig. 5 but showing a slightly modified form of standard; and Figure 8 is a cross-section on line 8—8 of Fig. 2.

In the mounting of windshield visors, one method employed is to provide a pivot bearing for the visor which is an integral part of the standards or windshield frame. This not only requires a special construction of windshield, but also is defective in that various makes of cars have different sizes and dimensions which require a different relation between the visor and the windshield. Also, a visor of such construction cannot be attached to standards which are not specially designed for such attachment. With our improved construction the visor is attachable to any construction of standard and is adjustable upon the same so as to obtain the desired relation. We have further provided adjustments for adapting the visor to different widths of windshield and for engaging the supporting brackets with windshield standards of various cross-section. In addition to the above, we have provided a simple guide which is engageable with one jaw member for directing the clamping movement of the cooperating jaw member to relieve the clamping screws of the transverse or shearing stresses to which they have heretofore been subjected.

Figure 1:
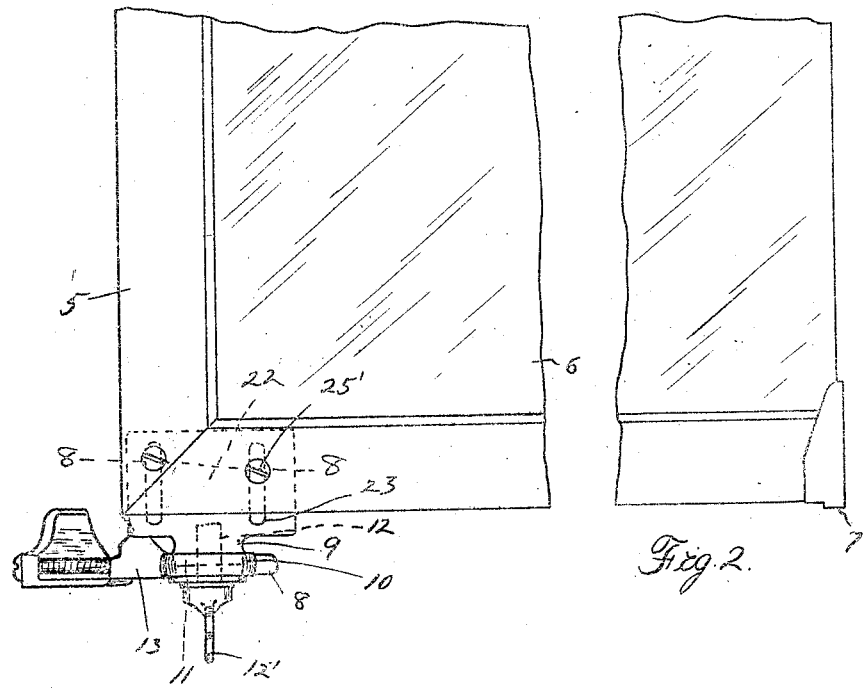
Figure 1 is a side elevation of the visor showing the same attached to a standard.
Figure 2:
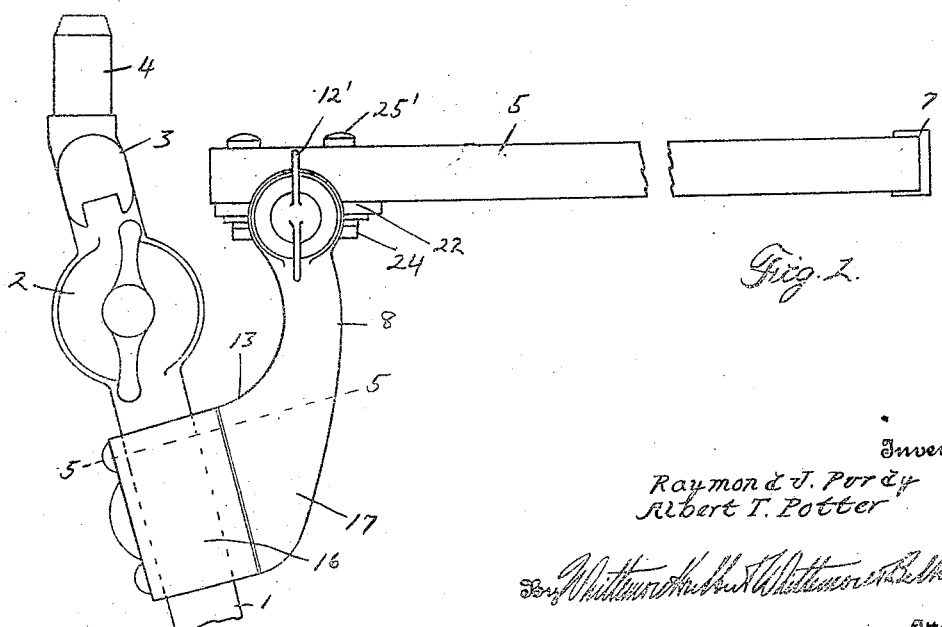
Figure 2 is a plan view.

In detail and as shown in Figure 1, the numeral 1 designates a standard of the windshield, 2 represents the pivot bearing for the upper section of the windshield, 3 designates the top bar of the windshield frame, and 4 designates the upstanding pin for attachment of the canopy top. The numeral 5 designates the visor which consists of a suitable frame having top and side bars with a transparent panel 6 mounted therein and secured by the corner clips 7. This frame is mounted upon the windshield standards by means of brackets 8 and cooperating pivot members 9. The bracket members are relatively thin in construction to present a neat and attractive appearance and are provided at their upper ends with conical sockets 10 which receive correspondingly tapered pivots 11 on the members 9. Threaded studs 12 project outwardly from the pivots 11 and winged clamping nuts 12' engage said studs and serve to secure the pivots in clamping engagement with the sockets.

The brackets 8 are secured to the windshield standards by a clamping engagement therewith below the pivot bearing 2 for the adjustable windshield section. This clamping bearing comprises a jaw member 13, preferably formed integral with the bracket, and a cooperating jaw member 14. Clamping screws 15 are provided for adjustably securing the jaw member 14 to the jaw member 13. Ordinarily the clamping screws form the sole guide means for the cooperating jaw so that when the screws are actuated, there is a tendency of the cooperating jaw to turn or twist about the standard and thus exert a transverse or shearing stress upon the screws. To avoid this turning or twisting movement of the cooperating screws, we have provided a relatively wide guide 16 which is preferably formed integral with the jaw member 14 and extends laterally from one edge thereof. This guide is adapted to slide along a flat bearing surface 17 disposed upon one side of the jaw 13. The flat bearing surface 17 is located in a plane which is parallel to the plane of the screws 15 so that the guide will direct the cooperating jaw along a straight line which is disposed in the plane of the screws.

Each jaw member 13 is fashioned at its outer end to receive standards of various cross-sections. As shown, each jaw member 13 is provided with an L-shaped transversely extending groove 13' at its outer end, which is adapted to receive a standard of substantially rectangular shape in cross-section (Figure 7). For receiving standards of oval cross-section (Figure 5), there is a transversely extending V-shaped groove 13'' in one side of the L-shaped groove 13'. Should it be desired to use the mounting upon another form of standard, such, for instance, as an inturned channel bar 18 (Figure 6), an auxiliary clip 19 is employed. This clip is preferably struck out of sheet metal to a substantially U-form, being apertured for the passage of screws 15 and having crimps 20 for engaging the V-shaped grooves in the jaws; also hooked flanges 21 for engaging the inner edges of the channel. If the cross-section of the windshield standards is different from either that shown in Fig. 5 or 6, the clip may be modified to engage the same and therefore, by provision of suitable exchangeable clips, the bracket may be adapted for engagement with any construction of standards.

For securing the visor to the windshield standards provision is made for lateral adjustment, so that variations in the width of the windshield will not require any corresponding variation in the visor frame. As shown, the member 9 has a relatively wide shank portion 22 which is provided with spaced parallel slots 23 for the passage of clamping screws 24. The slots 23 are located adjacent to the ends of the shank portions so that the clamping screws will engage both the top and side bars of the visor frame. Where the visor frame is tubular the screws 24 engage nut members 25 which are inserted through apertures in the tube and are provided with heads 25' for forming a shoulder engagement therewith.

With the construction as described, in the attachment of the visor, the jaw members 13 and 14 are first mounted on the windshield standards and are adjusted in height to suit the height of the canopy top. The members 9 are then engaged with the brackets and clamped by the winged nuts after which the shanks 22 may be attached to the visor frame by the clamping screws 24 and nuts 25. The slotted bearings 23 will permit of such attachment without regard to variations in width between the windshield standards and the visor frame. Thus the construction is easily mounted and adjusted to suit the particular windshield and particular type of car to which it is applied.

In the modified construction of Figure 4 the visor is attached to a closed body car. With this construction the pivot brackets 30 are secured to the front portion of the body adjacent to the windshield frame as indicated at 31 in Figure 4.

What we claim as our invention is:

1. The combination with windshield standards and a visor, of attachment means including pivot brackets for the visor, clamping jaws on said brackets for engaging said standards, cooperating jaw members, clamping screws engaging both of said jaw members, and removable clips engaging both of said jaw members, said clips being apertured for the passage of said screws.

2. The combination with windshield standards and a visor, of attachment means including pivot brackets for the visor, clamping jaws on said brackets for engaging said standards, cooperating jaw members having portions overlapping the first-mentioned jaw members, clamping screws engaging both of said jaw members, removable sheet metal clips engaging both of said jaw members, said clips being apertured for the passage of said screws, and hooked flanges extending from opposite sides of said clips for engagement with said standard.

3. The combination with windshield standards and a visor, of attachment means including brackets for the visor, clamping jaws on said brackets for engaging said standards, cooperating jaw members having portions overlapping the first-mentioned jaw members, said jaw members having aligned notches formed therein, clamping screws engaging both of said jaw members, and removable clips engaging both of said jaw members, said clips being apertured for the passage of said screws and having crimps engaging the notches in said jaws.

4. The combination with a windshield standard and a visor, of attachment means including a bracket for the visor, clamping jaws on said bracket for engagement with said standard, a clamping screw engaging said jaws, and a removable clip engaging said jaws, said clip being apertured for the passage of said screw.

In testimony whereof we affix our signatures.

RAYMOND J. PURDY.
ALBERT T. POTTER.